United States Patent [19]

Atsumi

[11] 4,157,570
[45] Jun. 5, 1979

[54] TV-CINE CONVERSION PROJECTOR

[75] Inventor: Kenichi Atsumi, Tokyo, Japan

[73] Assignee: Yamawa Denki K.K., Japan

[21] Appl. No.: 882,745

[22] Filed: Mar. 2, 1978

[30] Foreign Application Priority Data

Mar. 4, 1977 [JP] Japan .................................. 52-22815
Jan. 17, 1978 [JP] Japan .................................. 53-2736

[51] Int. Cl.² ...................... H04N 3/36; G03B 21/46;
G03B 21/48; G03B 1/22
[52] U.S. Cl. .................................. 358/215; 352/166;
352/180; 352/194; 352/216
[58] Field of Search ................ 358/131, 215; 352/168,
352/180, 194, 216, 220, 166

[56] References Cited

U.S. PATENT DOCUMENTS

| 2,849,914 | 9/1958 | Vinten | 352/166 |
| 3,002,423 | 10/1961 | Straub | 358/215 X |
| 3,870,407 | 3/1975 | Wakahara | 352/180 X |
| 3,951,531 | 4/1976 | Nakai et al. | 352/180 X |
| 4,094,595 | 6/1978 | Lieckfeldt | 352/194 X |

Primary Examiner—Robert L. Griffin
Assistant Examiner—Aristotelis M. Psitos
Attorney, Agent, or Firm—Otto John Munz

[57] ABSTRACT

The TV-cine conversion projector adapted to carry out the ordinary film projection of the projector at the feeding rate of the film frames of substantially 24 frames/sec. and 18 frames/sec., while, in cooperation with a TV camera tube such as a vidicon, it can convert the projected images of the film at the feeding rate of the film frames of substantially 24 frames/sec. and 18 frames/sec. into TV pictures scanned at the scanning rate of 60 fields/sec. or 50 fields/sec. comprises a main shaft driven at a constant speed, a sound sprocket driven by the driving shaft for rotation at a speed corresponding to the rate of intermittent feeding of the film, a shutter driven by the main shaft for synchronizing the rate of interruption of the projection light with the actuation of an intermittent film feeding claw driven by the driving shaft at a speed of substantially 24 frames/sec., the shutter being so determined that the rate of interruption of the projection light is synchronized with the scanning rate of TV camera tube when the main shaft is driven at the constant speed. Provision is made of clutch means for selectively switching the rotational speed of the sound sprocket to a speed corresponding to either of substantially 24 frames/sec. or 18 frames/sec. of the feeding rate of the film while the main shaft is held driven at the constant speed, intermittent film feeding preventing means adapted to selectively render the intermittent film feeding claw to be inoperative once per four times of operation thereof, and switching means operably coupling the clutch means with the intermittent film feeding preventing means, thereby permitting the intermittent film feeding preventing means to be rendered to be operable for inactivating the intermittent film feeding claw once per four times of operations thereof only when the switching means is switched to a position for switching the rotational speed of the sprocket from that corresponding to substantially 24 frames/sec. to that corresponding to substantially 18 frames/sec. so that the TV-conversion of the images of the film at the rate of feeding of the film of substantially 24 frames/sec. and 18 frames/sec. can be converted into TV pictures scanned either one of the scanning rates of 60 fields/sec. and 50 fields/sec.

9 Claims, 13 Drawing Figures

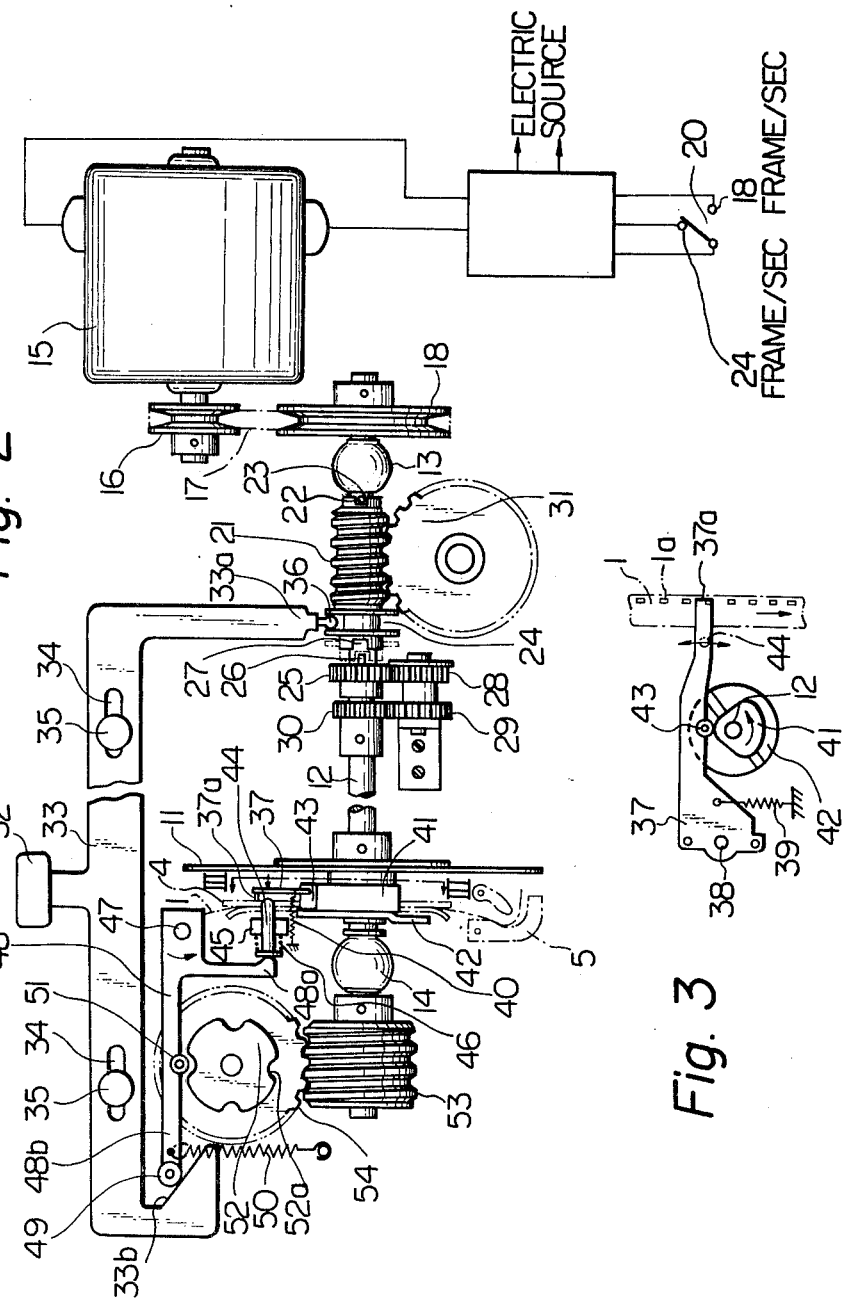

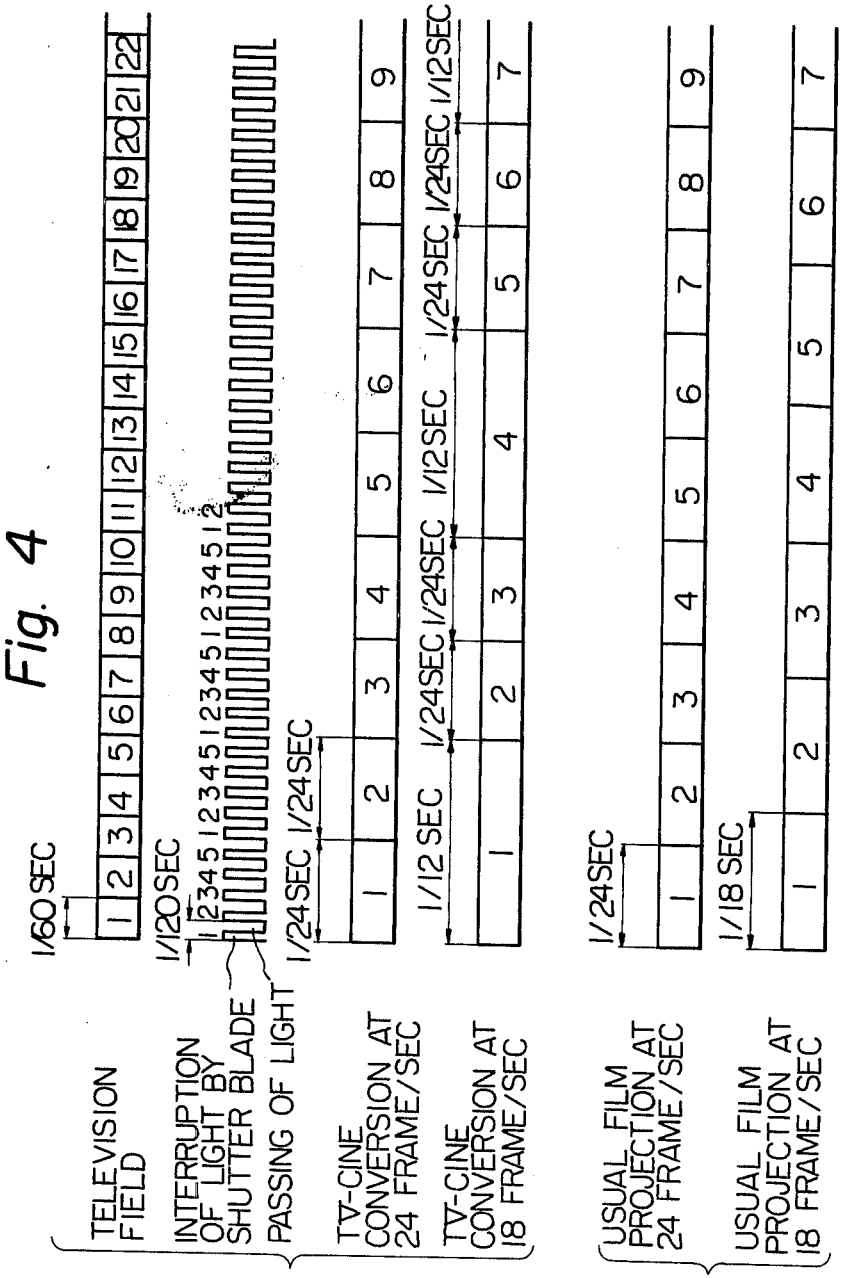

TV-CINE CONVERSION PROJECTOR

BACKGROUND OF THE INVENTION

The present invention relates to a TV-cine conversion projector which permits, in cooperation with a TV camera tube such as a vidicon, projected images of a film at the film frame feeding rate of 24 frames/sec. and 18 frames/sec. to be converted into TV pictures scanned at the scanning rate of 50 fields/sec. or 60 fields/sec. of the TV camera tube while it permits the ordinary projection of the images of the film frames at the film frame feeding rate of 24 frames/sec. and 18 frames/sec.

Heretofore, various TV-cine conversion projectors capable of converting projected images of a film into TV pictures have been proposed. In this case, it is essential that the intermittent interruption of the projection light by the shutter is effected in synchronism with the intermittent film feeding rate of the film, while the intermittent light interruption is completely synchronized with the scanning rate or the value of the field/sec. of the TV pictures. Otherwise, the timing of the intermittent interruption of the projected images of the film with the scanning rate of the TV camera tube cannot be appropriately maintained thereby resulting in bright or dark fringes running across the TV pictures thus deteriorating the quality of the TV pictures converted from the images of the film projected by the projector.

In an ordinary film projection by a projector, the rate of intermittent interruption of projection light must be selected to be at least 48 times/sec., preferably more than 50 times/sec., in order to avoid flickering of the projected images by reason of the afterimage effect.

To this end, the heretofore proposed TV-cine conversion projector of the type described above utilizes a shutter having too many light interrupting blades so that the projected images of the film tend to become dark, and the mechanism for changing the film feeding rate or for changing the number of the light interrupting blades of the shutter is made too complicated thereby tending to cause false functions or damages or breakage of the projector or the film. In other prior art projectors, the rotational speed of the shutter driving shaft is made too high so that very high noise is generated while too much wear can not be avoided.

SUMMARY OF THE INVENTION

In view of the above, the object of the present invention is to provide a TV-cine conversion projector of the type described above, which is simple in construction, easy to manipulate and accurate in operation, and by which ordinary film projection at the rate of 24 frames/sec. and 18 frames/sec. is made possible, while the film projection at the rate of substantially 24 frames/sec. and 18 frames/sec. can be converted into TV pictures scanned at either one of the scanning rate of 50 fields/sec. and 60 fields/sec.

According to one aspect of the present invention, the above object is achieved by the provision of a TV-cine projector in which the number of the light interrupting blades of the shutter is fixedly set to five and the main shaft of the projector which drives the shutter is rotated at the constant speed of 24 rev./sec. for the TV-cine conversion so as to actuate the film feeding cam coupled with the intermittent film feeding claw for intermittently feeding the film at the rate of 24 frames/sec., and which is provided with a simple selectively operable intermittent film feeding preventing means which, when operated, renders the intermittent film feeding claw to be inoperable once per four times of its film feeding operations and clutch means for switching the rotational speed of the sound sprocket of the projector from the speed corresponding to 24 frames/sec. of the intermittent film feeding to the speed corresponding to 18 frames/sec. of the film feeding and vice versa while the main shaft is rotated at the constant speed of 24 rev./sec., the clutch means being so coupled with the film feeding preventing means by switching means that the film feeding preventing means is actuated when the sound sprocket is switched so as to be rotated at the speed corresponding to 18 frames/sec. of the film feeding rate, thereby permitting the conversion of the film projection at the rate of either of 24 frames/sec. and 18 frames/sec. into TV pictures scanned at the rate of 60 fields/sec., the ordinary film projection at 24 frames/sec. and 18 frames/sec. being carried out by rotating the main shaft at 24 rev./sec. and 18 rev./sec., respectively, while the clutch means is held switched for rotation of the sound sprocket at the speed corresponding to 24 frames/sec. of the feeding rate of the film.

According to the other aspect of the present invention, the main shaft is driven at a fixed rotational speed of 25 rev./sec. so that the shutter having four projection light interrupting blades (the number of the blades may be changed to two under a predetermined conditions as described later) is rotated so as to intermittently interrupt the projection light at the rate of 100 times/sec. (50 times/sec. in case of two blade shutter) thereby permitting the timing of the light interruption to be synchronized with the scanning rate of TV pictures of 50 fields/sec. while the intermittent film feeding claw is operated at the rate of 25 frames/sec. (which is within the allowable range of the nominal film feeding rate of 24 frames/sec.) in synchronism with the intermittent interruption of projection light, provision being made of a switching lever and a clutch controlled by the switching lever, the clutch being so coupled with the sound sprocket that the latter is rotated by the rotation of the main shaft at the speed corresponding to 25 frames/sec. of the film feeding when the switching lever is switched to a first position thereby permitting the ordinary film projection as well as the conversion of projected images of the film at substantially 24 frames/sec. of the film feeding rate into TV pictures scanned at the scanning rate of 50 fields/sec., while, when the switching lever is switched to a second position, the sound sprocket is rotated by the clutch through a gear train incorporated therewith at the speed corresponding to the average intermittent film feeding rate of 18.75 frames/sec. which is within the limit of the nominal film feeding rate of 18 frames/sec. and, at the same time, an actuation lever which is selectively coupled with the film feeding claw and a cam driven by the main shaft is actuated by the switching lever when switched to the second position, so that the film feeding claw is rendered to be inoperable once per four times of its intermittent film feeding operations, thereby rendering the averge intermittent film feeding rate to be 25−25/4=18.75 frames/sec., thus synchronizing the film feeding rate with the rotation of the sound sprocket for achieving the ordinary film projection as well as the projected images of the film at the film feeding rate of substantially 18 frames/sec. into TV pictures scanned at the rate of 50 fields/sec.

In the above case, a speed control circuit for the driving motor of the main shaft may be provided so that the rotational speed of the main shaft is selectively varied to either of 24 rev./sec. or 18 rev./sec. Thus the projector can be operated at the accurate nominal film feeding speed of 24 frames/sec. or 18 frames/sec. for the ordinary projection of images of the film independently from the TV-cine conversion. In this case, however, it is preferable to provide a safety device which is coupled with the mechanical change-over switch of the speed control circuit so as to arrest the switching lever at the first position for prohibiting the switching operation thereof to the second position. Otherwise, the rotational speed of the main shaft might be changed to 24 rev./sec. or 18 rev./sec. to actuate the shutter in synchronism with the thus changed speed of the main shaft while the sound sprocket and the film feeding claw are subject to doubled reduction of speed due to the switching lever to the second position thereby making the proper synchronized operation of the projector impossible.

In the construction of the above described projector, switching means for changing the number of the light interrupting blades of the shutter from four to two may be provided. As described previously, the rate of interruption of the projection light must be made at least 48 times/sec., preferably more than 50 times/sec., in order to avoid the flickering effect. However, too many number of the light interrupting blades necessarily renders the light interrupting time to be unreasonably longer thereby resulting in dark images of the projected film. Therefore, the number of the light interrupting blades of the shutter is preferably changed from four to two insofar as the conditions allow to completely avoid the flickering effect by constructing the shutter by two shutter blades of the identical configuration each having two diametrically opposed light interrupting sectors, which blades, when overlapped in superposed positions, constitute a two blade shutter while, when they are positioned angularly shifted by 90° from each other, constitute a four blade shutter. The thus formed two blade shutter is utilized in operating the projector at the film feeding rates other than the rate of 18 frames/sec. for the ordinary film projection, thereby permitting the brightness of the projected images of the film or TV pictures converted therefrom to be increased while the flickering effect is completely avoided.

BRIEF DESCRIPTION OF THE DRAWINGS

FIG. 2 is a schematic side view showing the constructions of the first embodiment of the TV-cine conversion projector in accordance with the present invention;

FIG. 3 is a fragmentary side view along line III—III in FIG. 2;

FIG. 4 is a time chart showing the time sequence of various operations of the TV-cine projector of FIG. 2;

DETAILED DESCRIPTION OF THE PREFERRED EMBODIMENTS

Figure 1:
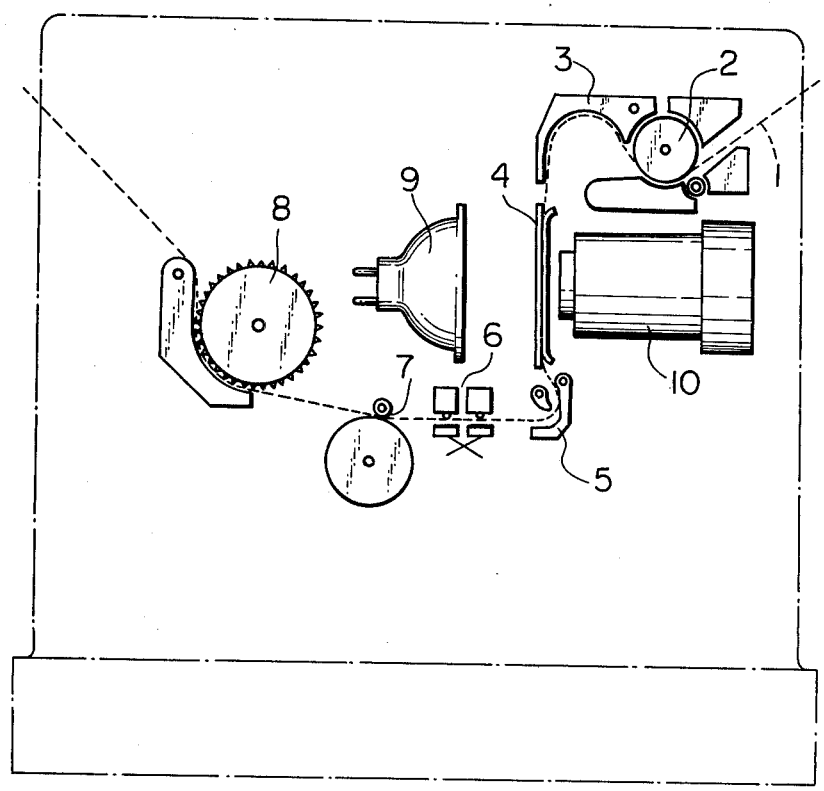
FIG. 1 is a schematic side view showing the general internal construction of a projector adapted to incorporate therein the present invention.

Referring to the figures, FIG. 1 shows a general schematic view of a projector incorporating the present invention. The film 1 is fed from a supply reel (not shown) by a feeding roller 2 into the projector and passed along an upper loop forming member 3 into a film projecting gate 4 so as to be intermittently driven by an intermittent film feeding claw (not shown) in FIG. 1 but described later). The film 1 fed out of the gate 4 is fed along a lower loop forming member 5 to a recording/reproducing unit 6 wherein a constant film feeding speed is given to the portion of the film 1 passing across the recording/reproducing unit 6 by means a constant film feeding speed roller unit 7, and, thence, it is fed around a sound sprocket 8 to a take-up reel (not shown). A light source 9 is provided for the projection of the images of the film 1 passing through the gate 4. The light from the light source 9 passes through the gate 4. The shutter interrupts the light from the light source 9 intermittently in synchronism with the intermittent feeding of the film 1 by means of the intermittent film feeding claw so that the images in the respective frames of the film 1 passing through the gate 4 is projected through a projection lens 10 onto a screen for effecting the ordinary film projection or onto a TV camera tube (not shown) such as a vidicon located in front of the projection lens 10 so as to permit the images of the film 1 to be converted into TV pictures by the TV camera tube.

FIG. 2 shows the essential parts of the first embodiment of the TV-cine conversion projector adapted to convert the projected images of the film at the film feeding rate of 24 frames/sec. and 18 frames/sec. into TV pictures scanned at the rate of 60 fileds/sec. while it permits the ordinary film projection at the film feeding rate of 24 frames/sec. and 18 frames/sec.

A main shaft 12 to which a shutter 11 having five light interrupting blades or sectors if fixedly secured is rotatably supported on the main body of the projector by means of bearings 13, 14, and is driven by a motor 15 through a pulley 16 of the motor 15, a belt 17 and a pulley 18 secured to the main shaft 12. The motor 15 is energized by a constant voltage circuit 19 so that it is driven at a constant rotational speed. The constant voltage circuit 19 is provided with a speed changing switch 20 so that the rotational speed of the main shaft 12 can be switched to either of the constant speeds of 24 rev./sec. and 18 rev./sec. As described later, the rotational speed of 18 rev./sec. of the main shaft 12 is only for the ordinary film projection and this rotational speed of the main shaft 12 is not utilized in TV-cine conversion. The TV-cine conversion is effected at the rotational speed of 24 rev./sec. of the main shaft 12 in either case of the film feeding rate of 24 frames/sec. and 18 frames/sec.

A worm 21 is freely rotatably and axially shiftably supported on the main shaft 12 and the worm 21 is formed with a first clutch recess 23 at its end while an annular clutch operating groove 24 and a second clutch recess 27 are formed at the other end of the worm 21. When the worm 21 is shifted axially in the rightward direction in FIG. 2, the first clutch recess 23 engages with a clutch pin 22 fixedly secured to the main shaft 12 so that the worm 21 is driven together with the main shaft 12. To the contrary when the worm 21 is axially moved in the leftward direction, the pin 22 is disengaged from the recess 23, and the second clutch recess 27 engages with a clutch pin 26 fixedly secured to a gear 25 freely rotatably supported on the shaft 12.

The gear 25 meshes with a gear 28 rotatably supported by a bracket on the main body of the projector and a gear 29 integrally secured to the gear 29 meshes with a gear 30 fixedly secured to the main shaft 12. The gear ratio of the gear train formed by the gears 25, 28, 29, 30 is so set that, when the gear 30 is rotated together with the main shaft 12 at the rotational speed of 24 rev./sec., the gear 25 is rotated in the same direction at the rotational speed of 18 rev./sec. Therefore, when the worm 21 is axially shifted to the right so as to engage the clutch pin 22 with the first clutch recess 23, the worm 21 is rotated in the same direction at the same speed of 24 rev./sec. as the main shaft 12 when rotated at 24 rev./sec., while, when the worm 21 is axially shifted to the left so as to engage the clutch pin 26 with the second clutch recess 27, the worm 21 is rotated in the same direction as the rotation of the main shaft 12 through the gears 25, 28, 29, 30 by the main shaft 12 at the rotational speed of 18 rev./sec. when the main shaft 12 is rotated at 24 rev./sec.

The worm 21 meshes with a worm wheel 31 which is operably coupled with the sound sprocket 8 so that the latter is rotated depending upon the position of the worm 21 at the speed corresponding to the rotational speed of 24 rev./sec. or 18 rev./sec. of the worm 21 which corresponds to the film feeding rate of 24 frames/sec. or 18 frames/sec. as described later.

In order to operate the clutch of the worm 21, a switching lever 33 having a manually manipulatable knob 32 integrally formed therewith is provided, which lever has elongated holes 34 in which guide pins 35 fixedly secured to the main body of the projector slidably engage so that the switching lever 33 is reciprocally guided in parallel to the longitudinal axis of the main shaft 12. A spherical actuating member 36 is provided on the tip of one arm 33a of the switching lever 33 and it slidably engages with the annular clutch groove 24 of the worm 21 so that the axial displacement of the worm 21 is controlled by the manipulation of the switching lever 33.

The shutter 11 secured to the main shaft 12 has five light interrupting blades or sectors and the shutter 11 is interposed between the light source 9 and the gate 4 so that the light from the light source 9 passing through the shutter 11 and the gate 4 is intermittently interrupted at the rate of 120 times/sec. when the main shaft 12 is rotated at the rotational speed of 24 rev./sec. This rate of the intermittent interruption of the light is integer of the scanning rate of 60 fields/sec. of the TV camera tube to be used with the projector for the conversion of the projected images of the film into TV pictures, thereby insuring the synchronization of the projected images of the film with the TV pictures.

As seen from FIGS. 2 and 3, and intermittent film feeding claw 37 is provided adjacent to the gate 4 and it is supported on the main body of the projector by a pivot 38 so that the claw 37 can be swung upwardly and downwardly as well as reciprocally in the direction perpendicular to the plane of FIG. 3 and is urged downwardly in FIG. 3 by a spring 39 and toward the gate 4 by a spring 40. Thus, the film engaging tip 37a of the claw 37 is adapted to pass through an elongated grooves (not shown) formed in the gate 4 so as to engage with one of the perforations 1a of the film 1.

In order to control the actuation of the claw 37 for effecting the intermittent feeding of the film 1 in synchronism with the operation of the shutter 11, a peripheral cam member 41 and a face cam member 42 are fixedly secured to the main shaft 12 in the well known manner, and a follower 43 secured to the claw 37 operably engages with the cam 41 as well as with the cam 42 so that the tip 37a of the claw 37 rectangular movement in the vertical plane parallel to the longitudinal axis of the main shaft 12 in the well known manner by the cooperation of the follower 43 with the cams 41, 42 each time the main shaft 12 rotates one revolution thereby intermittently feeding the film 1 by one frame per one revolution of the shaft 12 by the engagement of the tip 37a of the claw 37 with one of the perforations 1a of the film 1. The angular phase of each of the cams 41, 42 is so set that the intermittent feeding of the film 1 is effected during the time the projection light is interrupted by one of the shutter blades of the shutter 11.

In the present invention, in order to permit the projected images of the film 1 occurring at the rate of 24 frames/sec. as well as at 18 frames/sec. when the main shaft 12 is rotated at 24 rev./sec. to be converted into TV pictures at the scanning rate of 60 fields/sec., a push rod 44 is provided in opposed relationship to the claw 37, which push rod is slidably supported in a bracket 45 secured to the main body of the projector as seen in FIGS. 2 and 3. Thus, when the push rod 44 is urged to the right in FIG. 2, it abuts against the claw 37 so that the actuation of the claw 37 for intermittently feeding the film 1 is prohibited by the push rod 44.

In order to permit the push rod 44 to be selectively moved against the claw 37, the push rod 44 is normally urged by a spring 46 in the direction part from the claw 37, while the distal end of the push rod 44 opposite to that located adjacent to the claw 37 is adapted to cooperate with the rounded tip of one arm 48a of a generally L-shaped actuating lever 48 pivotally supported at its intermediate portion to the main body of the projector by a pivot shaft 47, thereby permitting the push rod 44 to be urged against the claw 37 against the action of the spring 46 so as to render the claw 37 to be inoperable when the lever 48 is swung in the counterclockwise direction as indicated by the arrow in FIG. 2. The other arm 48b of the actuating lever 48 rotatably supports a follower roller 49 to be described later at its tip and the lever 48 is urged by a spring 50 in the counterclockwise direction to urge the push rod 44 with its arm 48a. The force of spring 50 is so set that the lever 48 is swung in the counterclockwise direction by the action of the spring 50 to move the push rod 44 to the right against the action of the spring 46 when the lever 48 is permitted to be swung.

In order to control the operation of the actuating lever 48, a rotatable follower 51 is provided at an intermediate portion of the arm 48b and the roller 51 is located so as to cooperate with a cam member 52 having four recessed cam portions 52a equally angularly spaced around the periphery of the cam member 52, while the follower roller 49 is adapted to cooperate with an inclined cam surface 33b formed at the end of the switching lever 33 opposite to the arm 33a.

The cam member 52 is integrally secured to a worm wheel 54 meshing with a worm 53 fixedly secured to the main shaft 12. The gear ratio of the worm 53 and the worm wheel 54 is so set that the cam member 52 is rotated by the angle of 90° each time the worm 53 and, hence, the main shaft 12 are rotated four revolutions, i.e., each time the intermittent feeding operation of the film 1 is effected four times by the claw 37.

The angular positions of the recessed cam portion 52a of the cam member 52 are so set that one of the recessed cam portions 52a comes to the position in alignment with the follower roller 51 of the actuating lever 48 in timed relationship with one of the actuations of the intermittent film feeding claw 37, thereby permitting the lever 48 to be swung in the counterclockwise direction by the action of the spring 50 when one of the recessed cam portions 52a of the cam member 52 engages with the follower roller 51 so as to move the push rod 44 to the right for rendering the claw 37 to be inoperative, such inactivation of the claw 37 taking place once per four times of the actuations of the claw 37 as is clear from the above description. When the follower roller 51 engages with the peripheral surface of the cam member 52, the lever 48 is arrested at a position to alow the actuation of the claw 37.

Therefore, the above inactivation of the claw 37 takes place six times per 24 times of the actuations of the claw 37 thereby resulting in average 18 frames/sec. of the intermittent feeding of the film 1 while the main shaft 12 is rotated 24 rev./sec. The above inactivation of the claw 37 is utilized in converting the projected images of the film 1 at the rate of average 18 frames/sec. into TV pictures at the scanning rate of 60 fields/sec. by virtue of the revolution of the main shaft 12 at the rotational speed of 24 rev./sec. permitting the synchronization of the intermittent interruption of the projection light of 120 times/sec. by the shutter 11 with the TV scanning rate.

In the above described construction of the projector, if the actuating lever 48 is permitted to be actuated by the cam member 52 when the worm 21 is rotated at 24 rev./sec. together with the main shaft 12 by the manipulation of the switching lever 33, then the rate of the intermittent feeding of the film 1 by the claw 37 is reduced to average 18 frames/sec. by the action of the push rod 44 actuated by the actuating lever 48, whereas the sound sprocket 8 is rotated at the speed corresponding to the 24 frames/sec. of the intermittent feeding of the film 1 by the worm 21 rotating at 24 rev./sec., thereby rendering the feeding of the film 1 to be out of synchronization with the sound sprocket 8. The inclined cam surface 33b of the switching lever 33 cooperating with the follower roller 49 of the actuating lever 48 serves to positively avoid such a false function of the feeding of the film 1. In other words, the actuating lever 48 is rendered to be inoperative by the cam surface 33b urging the follower roller 49 and, hence, the actuating lever 48 upwardly to disengage the follower roller 51 from the cam member 52 when the switching lever 33 is moved to the right so as to rotate the worm 21 at 24 rev./sec. together with the main shaft 12, thereby insuring the actuation of the claw 37 for feeding the film at 24 frames/sec. insofar as the worm 21 is rotated at 24 rev./sec., whereas, when the switching lever 33 is moved to the left so as to rotate the worm 21 at 18 rev./sec. for rotating the sound sprocket 8 at the speed corresponding to 18 frames/sec. of the feeding of the film 1, the follower roller 49 is freed from the inclined cam surface 33b of the switching lever 33 thereby permitting the actuating lever 48 to be actuated by the cam member 52 engaging with the follower roller 51 so as to reduce the rate of the feeding of the film 1 to average 18 frames/sec., thus insuring the synchronization of the actuation of the claw 37 with the rotation of the sound sprocket 8.

FIG. 4 shows a time chart of the various modes of operations of the projector described above. The interruption of projection light by the shutter 11 is effected twice (120 times/sec.) in synchronism with the TV scanning rate of 60 fields/sec. by virtue of the five blade shutter 11 rotated at 24 rev./sec. by the main shaft 12. The interruption of the light is effected in synchronism with the commencement of the scanning.

In the case of conversion of the projected images of the film 1 at 24 frames/sec. into TV pictures of 60 fields/sec., each frame (1, 2, 3, - - -) of the film 1 is fed at the time interval of 1/24 sec. in synchronism with the interruption of the light by the shutter 11 and converted into TV pictures scanned at 60 fields/sec. in synchronism therewith.

In the case of conversion of the projected images of the film 1 into TV pictures of 60 fields/sec., the intermittent feeding of the film 1 at the time interval of 1/24 sec. is inactivated once per four times of the feeding operations as described previously, i.e., the first frame 1 is fed in 1/12 sec., the second frame 2 is fed in 1/24 sec., the third frame 3 is fed in 1/24 sec. and so on, thereby resulting in the average rate of feeding of the film 1 of 18 frames/sec. The respective feeding operation is synchronized with the interruption of the light by the shutter 11.

In the ordinary film projection, the actuating lever 48 is held inoperative and the rate of feeding of the film 1 is selectively changed to 24 frames/sec. or 18 frames/sec. by the operation of the speed changing change-over switch 20.

As described above, the conversion of the images of the film 1 into TV pictures in either of the film feeding rate of 24 frames/sec. and 18 frames/sec. by the actuation of the switching lever 33 to the right for 24 frames/sec. and to the left for 18 frames/sec. while the main shaft 12 is held rotated at the constant rotational speed of 24 rev./sec. However, if the switching lever 33 is permitted to be moved to the left for the conversion of the images of the film 1 at 18 frames/sec. into TV pictures while the speed changing change-over switch 20 is held switched to the position for the ordinary film projection at the rate of 18 frames/sec. by the rotation of the main shaft 12 at 18 rev./sec., then the worm 18 and, hence, the sound sprocket 8 as well as the film feeding claw 37 are subjected to doubled or surplus reduction of the rate of operation thereby resulting in false function of the projector. In order to avoid such a false function, a safety device is provided in accordance with the present invention, which positively prohibits the movement of the switching lever 33 to the left to the position for conversion of the images of the film at 18 frames/sec. into TV pictures unless the switch 20 is held at the position for 24 frames/sec. of the feeding of the film 1. In other words, the safety device so operates that it positively arrests the switching lever 33 in its rightmost position for rendering the actuating lever 48 to be inoperative insofar as the switch 20 is held for rotation of the main shaft 12 at 18 rev./sec.

Figure 5:
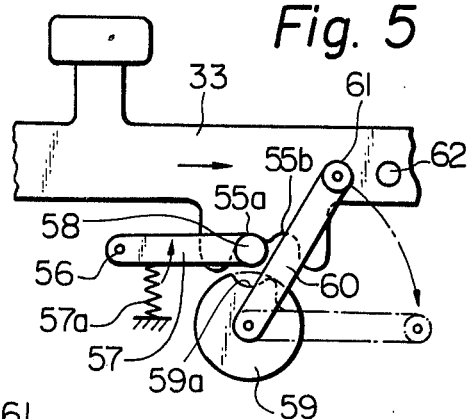
FIGS. 5 and 6 are schematic fragmentary side views showing the safety device adapted to be incorporated in the TV-cine projector of FIG. 2 in different modes of operation, respectively.
Figure 6:
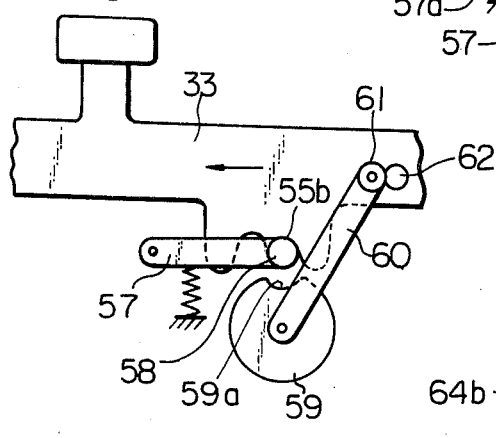

FIGS. 5 and 6 show an embodiment of the safety device. Clicking recesses 55a, 55b are formed in the switching lever 33 as seen in FIG. 5, and a roller 58 provided at the free end of a swingable lever 57 which is pivoted by a shaft 56 and urged in the counterclockwise direction by a spring 57a is adapted to snugly engage with either one of the recesses 55a, 55b depending upon whether the switching lever 33 is held at the rightmost position for rotation of the worm 21 at 24 rev./sec. as well as for the inactivation of the actuating lever 48 (FIG. 5) or held at the leftmost position for rotation of the worm 21 at 18 rev./sec. as well as for free actuation of the actuating lever 48 (permitting inactivation of the claw 37 once per four times of its actuations) (FIG. 6) so as to arrest the switching lever 33 at that held position.

A peripheral cam 59 having a recss 59a and coupled with the switch 20 is positioned adjacent to the roller 58 so as to cooperate therewith. The angular position of the recess 59a of the cam 59 is so set that the recess 59a is positioned in alignment with the roller 58 as shown by the solid line in FIG. 5 when the switch 20 is set for 24 rev./sec. of the main shaft 12, so that the roller 58 is allowed to be moved downwardly so as to be disengaged from the recess 55a thereby permitting the switching lever 33 to be moved to the left for rotation of the worm 21 at 18 rev./sec. while the actuating lever 48 is rendered to be operative for inactivating the claw 37 once per four times of its operation assuming that the lever 33 has been held at its rightmost position as shown in FIG. 5.

To the contrary, when the switch 20 is swithced to the position for 18 rev./sec. of the main shaft 12, the recess 59a of the cam 59 is moved to the position shown by the broken line in FIG. 5 so that the roller 58 is arrested its downward movement by the periphery of the cam 59 thereby preventing the switching lever 33 from moving to the left.

On the other hand, when the lever 33 is held at its leftmost position for rotation of the worm 21 at 18 rev./sec. and switch 20 is held at the position for rotation of the main shaft 12 at 24 rev./sec. as shown in FIG. 6, a roller 61 provided at the free end of a lever 60 which is fixedly secured to the cam 59 is adapted to abut against a stopper pin 62 secured to the lever 33 thereby preventing the lever 60 and, hence, the cam 59 from rotating in the clockwise direction so as to switch the switch 20 to the position for the rotation of the amin shaft 12 at 18 rev./sec. The stopper pin 62, however, is spaced apart from the roller 61 when the lever 33 is held at its rightmost position (for rotation of the worm 21 at 24 rev./sec.) as shown in FIG. 5, thereby permitting the lever 60 positioned as shown by the solid line and, hence, the cam 59 to rotate in the clockwise direction as described previously.

Further, when the cam 59 is switched to the position for rotation of the main shaft 12 at 18 rev./sec. as shown by the chain line in FIG. 5, the lever 33 is arrested at its rightmost position for rotation of the worm 21 at 24 rev./sec. by virtue of the roller 58 being forced to engage with the recess 55a by the peripheral surface of the cam 59 preventing the downward movement of the rollers 58. Thus, it is made necessary to switch the switch 20 for rotation of the main shaft 12 at 24 rev./sec. in order to switch the lever 33 from the rightmost position to the leftmost position.

Figure 7:
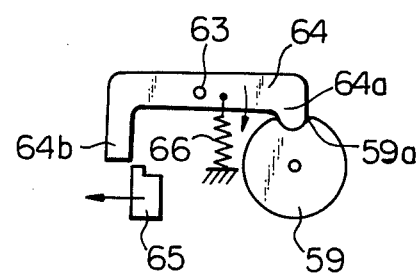
FIGS. 7 to 9 are schematic fragmentary side views showing the modified embodiment of the safety device of FIG. 5 in different modes of operation, respectively.
Figure 9:
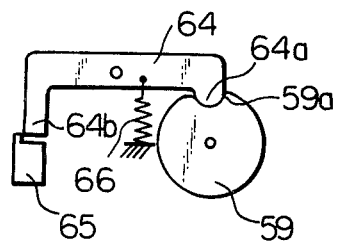

FIGS. 7 and 9 show a modified embodiment of the safety device. In this embodiment, a rounded end 64a of a lever 64 pivoted at its intermediate position by a shaft 63 and urged in the clockwise direction by a spring 66 is adapted to cooperate with the recess 59a of the cam 59 coupled with the switch 20, while the other bent end 64b of the lever 64 is adapted to cooperate with an interference member 65 which is secured integrally with the switching lever 33 or operably coupled therewith. The position of the member 65 is so set that is located at the right side of the bent end 64b of the lever 64 when the switching lever 33 is at the rightmost position.

As shown in FIG. 7, when the cam 59 and, hence, the switch 20 are positioned at the position for rotation of the main shaft 12 at 24 rev./sec. with the recess 59a being aligned with the rounded end 64a of the lever 64, the rounded end 64a is engaged in the recess 59a by the action of the spring 66 to rotate the lever 64 in the clockwise direction so that the member 65 is free to move from the position shown in FIG. 7 to the left beneath the bent end 64b of the lever 64 (FIG. 9) so as to move the lever 33 in the same direction thereby switching the rotational speed of the worm 21 from 24 rev./sec. to 18 rev./sec. while the rate of feeding of the film 1 is switched from 24 frames/sec. to average 18 frames/sec. by the actuation of the actuating lever 48 as described previously.

Figure 8:
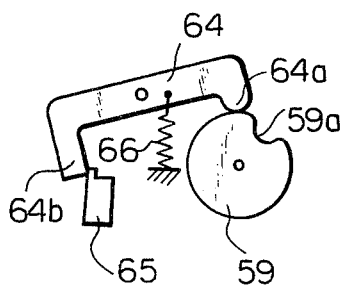

However, when the member 65 is positioned at the position for rotation of the worm 21 at 24 rev./sec. and the cam 59 is rotated so as to set the switch 20 at the position for rotation of the main shaft 12 at 18 rev./sec. as shown in FIG. 8, the lever 64 is urged in the counterclockwise direction against the action of the spring 66 by the periphery of the cam 59, so that the bent end 64b comes into the path of movement of the member 65 so as to arrest the leftward movement of the member 65 thereby preventing the switching of the lever 33.

To the contrary, when the lever 33 is held at the leftmost position for rotation of the worm 21 at 18 rev./sec. and for free actuation of the actuating lever 48 and the cam 59 is positioned to set the switch 20 for the rotation of the main shaft 12 at 24 rev./sec. as shown in FIG. 9, the lever 64 is held at the position at which the rounded end 64a engages with the recess 59a while the bent end 64b is located above the member 65 adjacent thereto. Therefore, rotation of the cam 59 for switching the switch 20 for rotation of the main shaft 12 at 18 rev./sec., is prevented, because the lever 64 is prevented from rotating in the counterclockwise direction to free the rounded end 64a from the recess 59a by virtue of the abutment of the bent end 64b against the member 65. In order to switch the switch 20 for rotation of the main shaft 12 at 18 rev./sec., the member 65 must be moved to the position shown in FIG. 7 at which the switching lever 33 is set at the rightmost position for rotation of the worm 21 at 24 rev./sec. and for inactivation of the actuating lever 48.

Thus, the false function is positively prevented and proper function of the projector is insured for permitting the ordinary film projection at the rate of 24 frames/sec. and 18 frames/sec. as well as the conversion of the projected images of the film at the rate of 24 frames/sec. and 18 frames/sec. into TV pictures scanned at the rate of 60 fields/sec.

Figure 10:
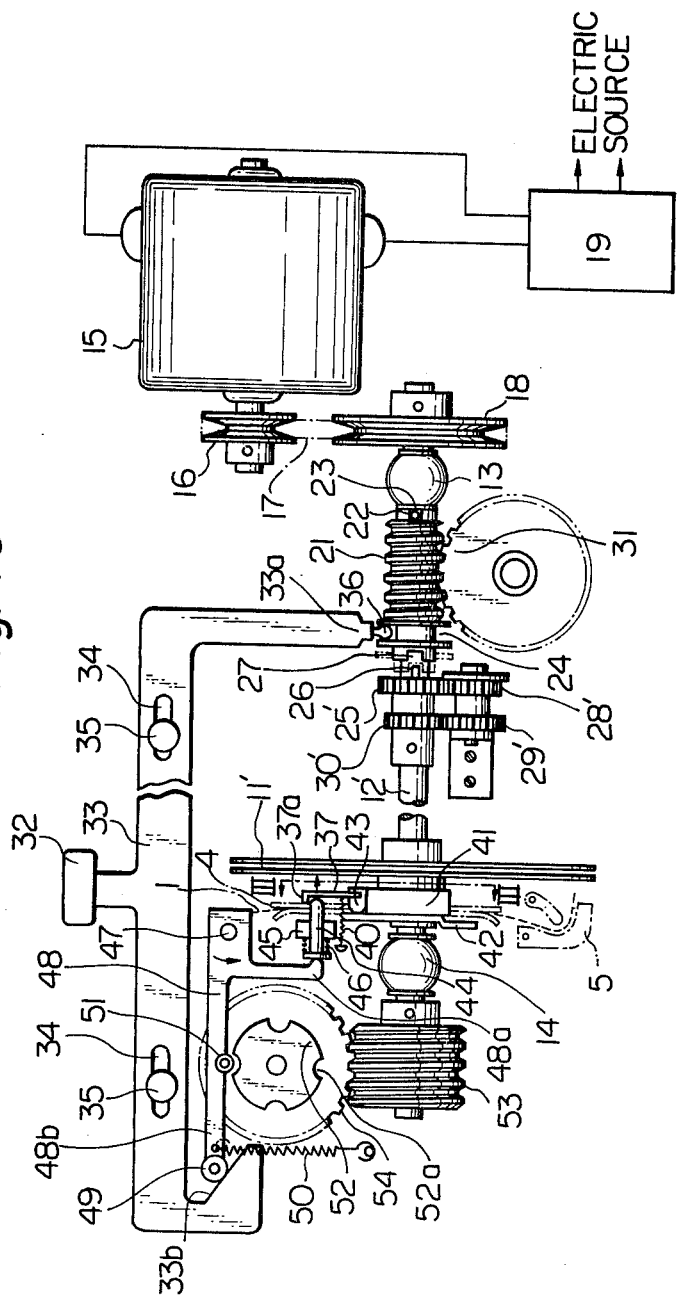
FIG. 10 is a schematic side view similar to FIG. 2 but showing the construction of the second embodiment of TV-cine projector in accordance with the present invention.

FIG. 10 shows the second embodiment of the present invention which has the function that the projected image of the film at substantially 24 frames/sec. and 18 frames/sec. can be converted into TV pictures at the scanning rate of 50 fields/sec. while ordinary film projection can be effected at either of the film feeding rate of 24 frames/sec. and 18 frames/sec.

The embodiment shown in FIG. 10 is substantially similar to that shown in FIG. 2 except that the speed changing change-over switch 20 of FIG. 2 is omitted and the shutter 11' of FIG. 10 is constructed as a four blade shutter capable of being converted into a two blade shutter as described later, while the main shaft 12' is rotated by the driving motor 15 at a speed of 25 rev./sec. with the gear ratio of the gear train constituted by the gears 25', 28', 29' and 30' being so set that the gear 25' is rotated at 25−25/4=18.75 rev./sec. in the same direction as that of the main shaft 12' when the same is rotated at 25 rev./sec. in order to permit the synchronization of the scanning rate of 50 fields/sec. with the feeding rate of the film at substantially 24 frames/sec. and 18 frames/sec.

The worm 21 meshes with the worm wheel 31 which is operatively coupled with the sound sprocket 8 so that the sound sprocket 8 is rotated at the speed corresponding to the feeding rate of the film at 25 frames/sec. or 18.75 frames/sec. when the worm 21 is rotated at 25 rev./sec. or 18.75 rev./sec. by the switching of the switching lever 33 as described previously. The feeding rates of the film of 25 frames/sec. and 18.75 frames/sec. are within the allowable limit of the nominal feeding rates of 24 frames/sec. and 18 frames/sec., respectively, so that they are considered as being substantially 24 frames/sec. and 18 frames/sec., respectively.

The shutter 11' having four light interrupting blades intermittently the projection light passing through the gate 4 100 times/sec. as the main shaft 12' rotates at 25 rev./sec., i.e., the number of intermittent interruption of the light by the shutter 11' is twice the scanning rate of 50 fields/sec., therby permitting the synchronization of the timing of the light interrupted with the scanning rate of 50 fields/sec.

In order to make it possible to convert the projected images of the film at the feeding rate of substantially 24 frames/sec. and 18 frames/sec. (exactly speaking, 25 frames/sec. and 18.75 frames/sec., respectively) into TV pictures of 50 fields/sec. when the main shaft 12' is rotated at 25 rev./sec. in the projector shown in FIG. 10, a push rod 44 is provided as previously described which cooperates with the intermittent film feeding claw 37 thereby selectively inactivating the claw 37 once per four times of the operations thereof when the worm 21 is switched so as to be rotated at 18.75 frames/sec. by the switching of the switching lever 33 through the actuating lever 48.

As previously described, the angular position of each recess 52a of the cam 52 is so set that it engages with the follower roller 51 of the actuating lever 48 by the rotation of the cam 52 by 90° so as to swing the actuating lever 48 in the counterclockwise direction by the action of the spring 50 to push the push rod 44 in synchronism with one of four times of operation of the claw 37 thereby rendering the claw 37 to be inoperable for feeding the film 1 once per four times of operation of the claw 37. Thus, the number of times of the feeding of the film 1 by the claw 37 is reduced by virtue of the provision of the actuating lever 48 from 24 times (the rate of feeding being actually 25 times/sec.) to average 18 times (the rate of feeding being actually 18.75 times/sec.). The above reduction of the number of times of the feeding of the film 1 serves to permit the projected images of the film 1 at 18.75 frames/sec. (nominal 18 frames/sec.) to be converted into TV pictures at the scanning rate of 50 fields/sec. by maintaining the rotational speed of the main shaft 12' at 25 rev./sec. thereby resulting in the rate of interruption of the light by the shutter 11' at 100 times/sec. permitting synchronization with the scanning rate of 50 fields/sec. as described later.

As previously described, if the actuating lever 48 is permitted to be actuated by the cam 52 so as to reduce the number of times of feeding the film 1 by the claw 37 as described above when the worm 21 is rotated at 25 rev./sec. by the main shaft 12' to drive the sound sprocket 8 at the speed corresponding to 25 frames/sec. nominal 24 frames/sec.) depending upon the setting of the switching lever 33, then the synchronization of the feeding rate of the film 1 with the sound sprocket 8 is destroyed.

In order to avoid such a false function, the inclined cam surface 33b is formed at the end of the switching lever 33 which cooperates with the follower roller 49 provided at the free end of the arm 48b of the actuating lever 48 as in the case of the embodiment of FIG. 2. Thus, when the switching lever 33 is moved to the right for rotating the worm 21 at 25 rev./sec., the actuation of the actuating lever 48 is prevented by the inclined cam surface 48b, thereby insuring the rate of feeding of the film 1 to be held at 25 frames/sec.

Figure 11:
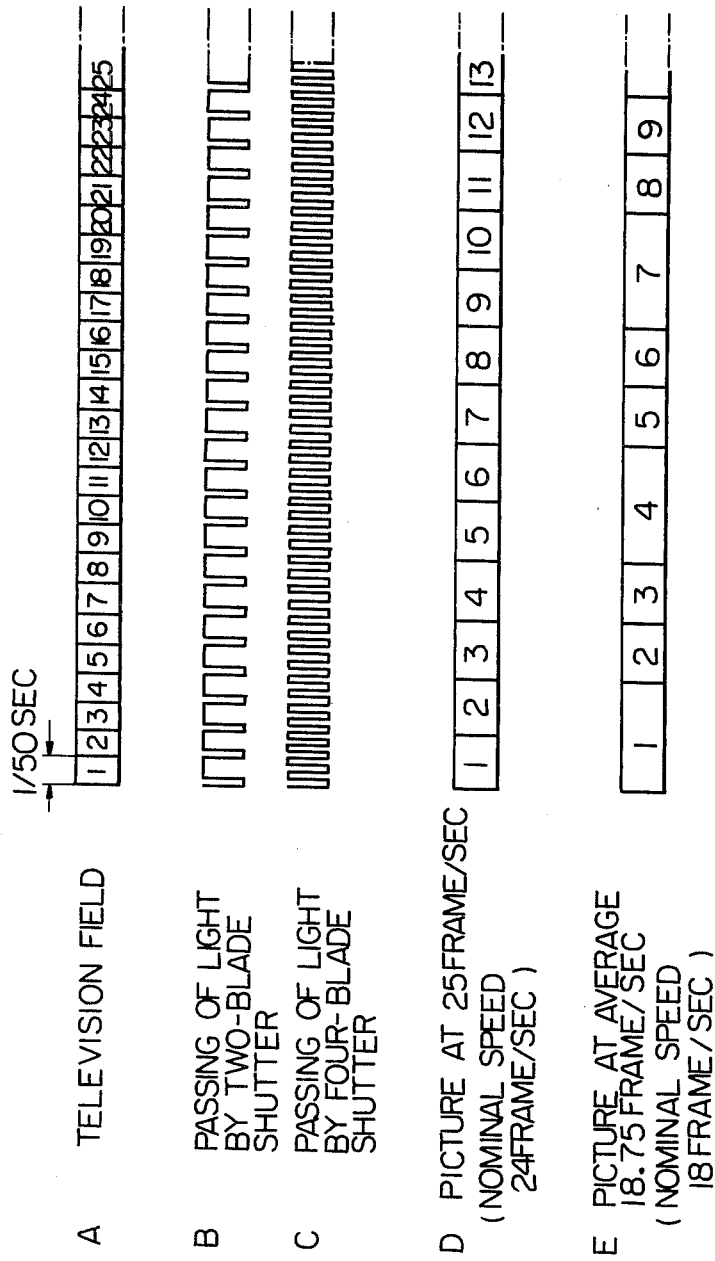
FIG. 11 is a time chart similar to FIG. 4 but showing the time sequence of the various operations of the TV-cine projector of FIG. 10.

FIG. 11 is a time chart showing the time sequence of various mode of operations of the projector of FIG. 10. The rate of interruption (100 times/sec.) of the projection light by the four blade shutter (C) as well as the rate of interruption (50 times/sec.) of the light by the two blade shutter (B) well synchronizes with the scanning rate of 50 fields/sec. (A). The interruption of the light takes place at the beginning of each scanning cycle of TV field in synchronism therewith.

The conversion of the projected images of the film at 25 frames/sec. (nominal 24 frames/sec.) into TV pictures at 50 fields/sec. is effected by the claw 37 actuated at 25 times/sec. in synchronism with the interruption of the light.

In the case of the conversion of the projected images of the film at average 18.75 frames/sec. (nominal 18 frames/sec.) into TV pictures at 50 fields/sec., the actuation of the claw 37 is rendered inoperative once per four times of the operation thereof as previously described (E), the actuation of the claw 37 being synchronized with the interruption of the light.

The ordinary film projection may be naturally carried out in the manner as described above with the TV camera tube removed from the projector by switching the lever 33 to the right for nominal 24 frames/sec. and to the left for nominal 18 frames/sec.

Figure 12:
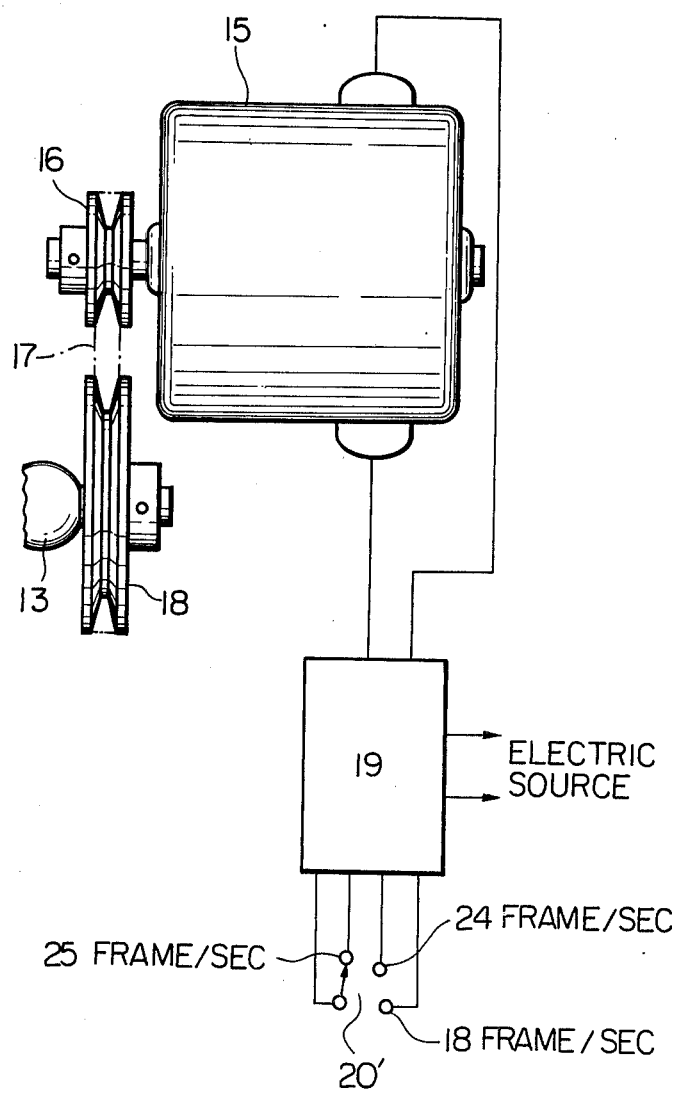
FIG. 12 is a schematic view showing the motor speed changing switch for the TV-cine projector of FIG. 10.

In accordance with the invention, however, exact rate of feeding the film at 24 frames/sec. as well as 18 frames/sec. for ordinary film projection can be achieved by the projector of FIG. 10 by merely providing speed changing change-over switch 20' so as to control the constant voltage circuit 19 for driving the motor 15 as shown in FIG. 12. By the provision of the switch 20', the speed of the motor 15 can be selectively changed to drive the main shaft 12' at either of 24 rev./sec. and 18 rev./sec. thereby permitting the ordinary film projection at 24 frames/sec. and 18 frames/sec. to be selectively carried out, because, in this case, synchronization of the feeding rate of the film as well as the rate of interruption of the light with the scanning rate of 50 fields/sec. is not required.

In this case, however, if the switching lever 33 is permitted to be switched to the left so as to drive the worm 21 at 18.75 rev./sec. when the switch 20' is set so as to drive the shaft 12' at 24 rev./sec. or 18 rev./sec., the doubled or surplus reduction of the rotational speed of the worm 21 and, hence, the sound sprocket 8 as well as doubled reduction of the rate of feeding the film 1 would occur thereby causing false function of the projector as previously described.

In order to positively avoid such a false function, a safety device similar to those shown in FIGS. 5 and 6 and FIGS. 7 to 9 and previously described in connection with the projector of FIG. 12 may be equally applied to the projector of FIG. 10. In this case, the switching lever 33 is allowed to be moved to the left for the operation at average 18.75 frames/sec. insofar as the switch 20' and, hence, the cam 59 are set for rotation of the main shaft 12' at 25 rev./sec. as shown in solid line in FIG. 5 or in FIG. 7 as described previously, while the switching lever 33 is prevented from moving to the left for the operation at average 18.75 frames/sec. when the switch 20' and, hence, the cam 59 are set for rotation of the main shaft 12' at either of 24 rev./sec. and 18 rev./sec. as shown by the chain line in FIG. 5 and in FIG. 8. On the other hand, when the switching lever 33 is in the position for operation of the projector at 18.75 frames/sec. with the switch 20' and, hence, the cam 59 being positioned for rotation of the main shaft 12' at 25 rev./sec. as shown in FIGS. 6 and 9, then the switch 20' can not be switched to the position for rotation of the main shaft 12' at 24 rev./sec. or 18 rev./sec. as described previously.

As previously described, the rate of interruption of the light must be at least 48 times/sec., preferably more than 50 times/sec., in order to avoid the flickering effect on the projected images of the film. On the other hand, the brightness of the projected images is reduced with the increase in the number of light interrupting blades or sectors of the shutter for avoiding the flickering effect.

In the projector shown in FIG. 2, a shutter blade number switching device may be incorporated therein in order to increase the brightness of the projected images of the film in maintaining the synchronization with the rate of scanning of TV pictures and without causing the flickering effect. This is achieved by the provision of the device which can switch the number of the light interrupting blades of the shutter from four to two unless the projector is operated for the ordinary film projection (not for the TV-cine conversion) at the rate of 18 frames/sec. (and 24 frames/sec., if necessary). Of course, it is also possible to utilize a shutter having two light interrupting blades (the number of the blades not changeable) in the projector of FIG. 10 without substantially deteriorating the performance of the projector provided that the ordinary film projection is carried out at the rate of average 18.75 frames/sec. without changing the rotational speed of the main shaft 12' to 18 rev./sec. by the switching action of the switch 20'.

Figure 13:
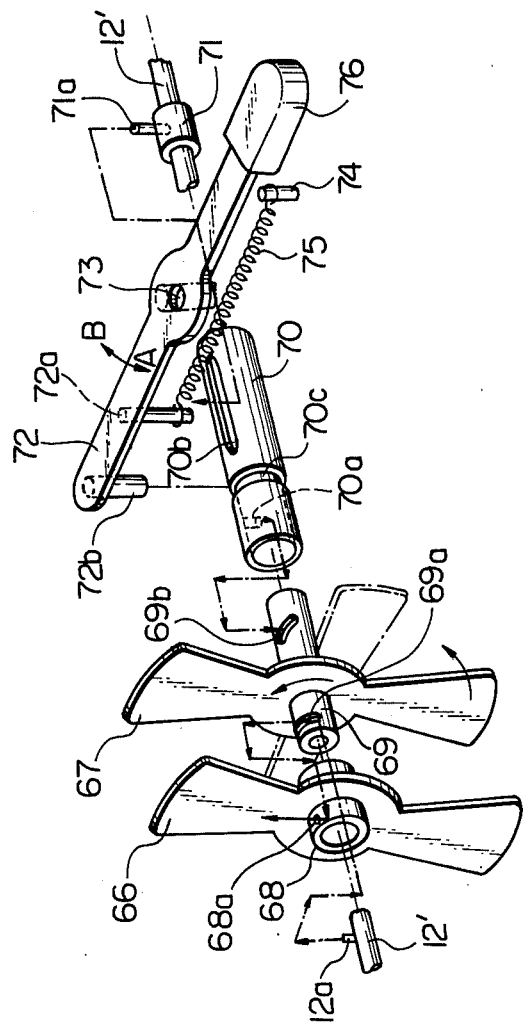
FIG. 13 is an exploded perspective view showing an embodiment of the shutter blade number changing means of the TV-cine projector of FIG. 10.

FIG. 13 shows an example of the shutter blade number switching device.

In FIG. 13, the shutter shown comprises a pair of shutter blades 66, 67 of the same configuration having two diametrically oppositely oriented light interrupting sectors. The sleeve 68 to which the blade 66 is secured is rotatably supported on the sleeve 69 to which the blade 67 is secured. The sleeve 69 is rotatably supported on the main shaft 12' and is provided with a circumferentially extending hole 69a. The elongated hole 69a of the sleeve 69, when the sleeve 69 is assembled with the sleeve 68 in position, is aligned with a securing hole 68a of the sleeve 68 and a pin 12a secured to the main shaft 12' engages with the securing hole 68a of the sleeve 68 as well as with the elongated hole 69a of the sleeve 69 slidably, so that the sleeve 68 and the blade 66 are secured to the main shaft 12' for rotation therewith, while the sleeve 69 and the blade 67 are prevented their axial movement relative to the main shaft 12' within the limit determined by the length of the elongated hole 69a, which limit is so determined that the blade 67 is movable beteen a position at which the light interrupting sectors of the blade 67 are aligned with those of the blade 66 so as to form a two blade shutter and a position at which the blade 67 is rotated by 90° relative to the blade 66 so as to form a four blade shutter as shown by the chain line in FIG. 12. A helical groove 69b having a predetermined helical angle and a predetermined length is formed in the rearwardly extended portion of the sleeve 69, and an elongated switching sleeve 70 is rotatably supported on the rearwardly extended portion of the sleeve 69. A pin 70a secured in the inner wall of the switching sleeve 70 are slidably engaged in the helical groove 69b of the sleeve 69. The rearward portion of the switching sleeve 70 is axially slidably supported by a guide sleeve 71 secured by a pin 71a to the main shaft 12', while the outwardly extending portion of the pin 71a slidably engages with an axially extending groove 70b formed in the switching sleeve 70 so that the switching sleeve 70 is axially slidable within the limit determined by the helical groove 69b of the sleeve 69 in which the pin 70a slidably engages while the rotation of the switching sleeve 70 relative to the main shaft 12' is prevented by the pin 71a. At one axial position of the switching sleeve 70 at which the pin 70a abuts against one end of the helical groove 69b of the sleeve 69, the blade 67 is held in alignment with the blade 66 so as to form a two blade shutter and the four blade shutter is formed by the two blades 66 and 67 when the sleeve 70 is axially shifted to a position at which the pin 70a abuts against the other end of the helical groove 69b of the sleeve 69.

In order to switch the position of the blade 67 to either of the above described two positions forming the two and the four blade shutter, an annular groove 70C is formed in the outer surface of the sleeve 70 and a pin 72b secured at one end of a manually operable swingable lever 72 slidably engages with the groove 70C so that the sleeve 70 can be shifted axially to either of the two positions for forming the two and the four blade shutter. The lever 72 per se is pivoted at its intermediate portion about a pivot shaft 73 secured to the main body of the projector and is provided with a knob 76 at the other end thereof for the manual operation of the lever 72. A pin 72a is secured to the lever 72 adjacent to the end at which the pin 72b is secured and one end of a tension spring 75 is secured to the pin 72 while the other end of the spring 75 is secured to a pin 74 secured to the main body at a position opposite to the pin 72a with respect to the pivot shaft 73. Thus, when the lever 72 is swung in one direction indicated by the arrow A to the position for forming the two blade shutter as described above, the spring 75 forces the lever 72 so as to maintain the lever 72 at this position, while, when the lever 72 is swung in the opposite direction indicated by the arrow B to the position for forming the four blade shutter, the spring is moved beyond its dead point with respect to the pivot shaft 73 so that the spring 75 forces the lever 72 for maintaining the lever 72 at this switched position.

Alternatively, the lever 72 or the switching sleeve 70 may be operably coupled with the speed changing change-over switch 20' so that the four blade shutter is formed only when the switch 20' is switched to the position for rotating the main shaft 12' at 18 rev./sec. (and, further, at 24 rev./sec., if desired), while the two blade shutter is formed when the switch 20' is switched to the position for rotating the main shaft 12' at 25 rev./sec. (and at 24 rev./sec., if desired.)

I claim:

1. TV-cine conversion projector for converting projected images of a film fed at the feeding rate of 24 frames/sec. and 18 frames/sec. into TV pictures in co-operation with a TV camera tube while permitting the ordinary film projection at the feeding rate of the film of 24 frames/sec. and 18 frames/sec., wherein the improvement comprises a main shaft rotated at a predetermined constant rotational speed and driving a shutter so as to intermittently interrupting the projection light of the projector at a scanning rate of TV pictures in terms of fields/sec. or the integer thereof, clutch means driven by said main shaft and capable of switching the rotational speed of a sound sprocket of the projector at a speed corresponding to either of substantially 24 frames/sec. and 18 frames/sec., intermittent film feeding means driven by said main shaft for intermittently feeding the film at substantially 24 frames/sec., intermittent film feeding preventing means selectively engageable with said intermittent film feeding means so as to render the latter to be inoperative once per four times of the actuation of said intermittent film feeding means, and switching lever means operably coupling said clutch means with said intermittent film feeding preventing means, said switching lever means being so constructed that said intermittent film feeding preventing means is engaged with said intermittent film feeding means only when said clutch means is switched by said switching lever means so as to rotate said sound sprocket at the speed corresponding to substantially 18 frames/sec.

2. TV-cine conversion projector according to claim 1, wherein said main shaft is driven at the speed of 24 rev./sec. and said shutter comprises five light interrupting sectors rotated together with said shaft, said clutch means being so constructed as to rotate said sound sprocket at either of speeds corresponding to 24 frames/ec. and 18 frames/sec., thereby permitting projected images of the film fed at the feeding rate of 24 frames/sec. or 18 frames/sec. to be converted into TV pictures scanned at the scanning rate of 60 fields/sec.

3. TV-cine conversion projector according to claim 2, further comprising change-over switch means capable of switching the rotational speed of said main shaft to a speed of 18 rev./sec. corresponding to the rate of intermittent feeding of the film of 18 frames/sec. only when said switching lever means switches said clutch means to a position at which said sound sprocket is driven at the speed corresponding to the rate of feeding of the film of 24 frames/sec.

4. TV-cine conversion projector according to claim 3, further comprising arresting means for preventing said switching lever means from being actuated to engage said intermittent film feeding preventing means with said intermittent film feeding means when said change-over switch means is switched to the position at which said main shaft is rotated at the speed of 18 rev./sec.

5. TV-cine conversion projector according to claim 1, wherein said main shaft is rotated at 25 rev./sec. and said shutter comprises four light interrupting sectors rotated together with said main shaft, said clutch means being so constructed as to rotate said sound sprocket at either of speeds corresponding to 25 frames/sec. and 18.75 frames/sec., thereby permitting projected images of the film fed at the feeding rate of substantially 24 frames/sec. or 18 frames/sec. to be converted into TV pictures scanned at the scanning rate of 50 fields/sec.

6. TV-cine conversion projector according to claim 5, further comprising change-over switch means capable of switching the rotational speed of said main shaft to a feed either of 24 rev./sec. and 18 rev./sec. corresponding to the rate of intermittent feeding of the film either of 24 frames/sec. and 18 frames/sec., respectively, only when said switching lever means switches said clutch means to a position at which said sound sprocket is driven at the speed corresponding to the rate of feeding of the film of 25 frames/sec.

7. TV-cine conversion projector according to claim 6, further comprising arresting means for preventing said switching lever means from being actuated to engage said intermittent film feeding preventing means with said intermittent film feeding means when said change-over switch means is switched to the position at which said main shaft is rotated at the speed either of 24 rev./sec. and 18 rev./sec.

8. TV-cine conversion projector according to claim 6, further comprising shutter sector number switching means capable of selectively switching the number of the light interrupting sectors of said shutter from four to two when said main shaft is rotated at either of the speeds of 25 rev./sec. and 24 rev./sec.

9. TV-cine conversion projector according to claim 8, wherein said shutter comprises a pair of shutter blades of the same configuration each having a pair of diametrically opposite light interrupting sectors, said blades being rotatable relative to each other with one of said blades secured to said main shaft, said shutter sector number switching means comprising a helical groove formed in a sleeve secured to the other of said blades and an axially shiftable pin engaging with said helical groove thereby rotating said other of said blades relative to said one blade so as to align said pair of blades with each other for forming two blade shutter when said pin is moved axially in one direction to a first position, while, when said pin is moved in the opposite direction to a second position, said other of said blades is angularly rotated by 90° relative to said one blade thereby forming four blade shutter.

* * * * *